(No Model.) 2 Sheets—Sheet 1.
H. MAASS.
CAR FENDER AND BRAKE.

No. 522,530. Patented July 3, 1894.

WITNESSES
Geo. E. Frech
Joseph P. Burg

INVENTOR
Henry Maass
per
Lehmann Pattison & Nesbit
Attys (No Model.) 2 Sheets—Sheet 2.

H. MAASS.
CAR FENDER AND BRAKE.

No. 522,530. Patented July 3, 1894.

WITNESSES—
Geo. E. Frech,
Joseph P. Burg

INVENTOR—
Henry Maass
per
Lehmann Pattison & Redit.
attys

UNITED STATES PATENT OFFICE.

HENRY MAASS, OF JERSEY CITY, NEW JERSEY.

CAR FENDER AND BRAKE.

SPECIFICATION forming part of Letters Patent No. 522,530, dated July 3, 1894.

Application filed March 22, 1894. Serial No. 504,685. (No model.)

*To all whom it may concern:*

Be it known that I, HENRY MAASS, of Jersey City (Heights), in the county of Hudson and State of New Jersey, have invented certain new and useful Improvements in a Combined Street Car Fender and Automatic Brake; and I do hereby declare the following to be a full, clear, and exact description of the invention, such as will enable others skilled in the art to which it pertains to make and use it, reference being had to the accompanying drawings, which form part of this specification.

My invention relates to improvements in combined street car fenders and automatic brakes, and it consists in the construction and arrangement of parts which will be fully described hereinafter and particularly referred to in the claims.

The object of my invention is to provide a combined street car fender and automatic brake, whereby when the fender is struck by a person or other object, it descends and catches the person or object, and instantly applies a powerful track brake for stopping the car.

Figure 1:
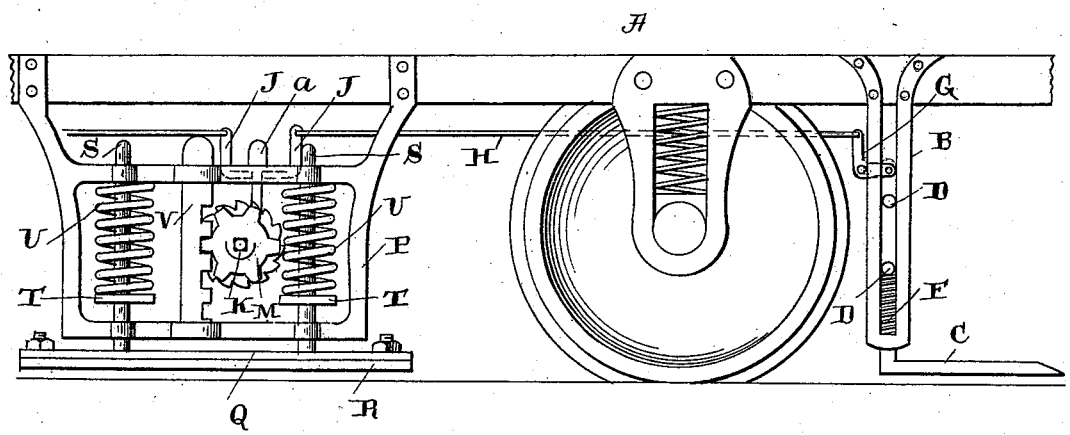
Figure 3:
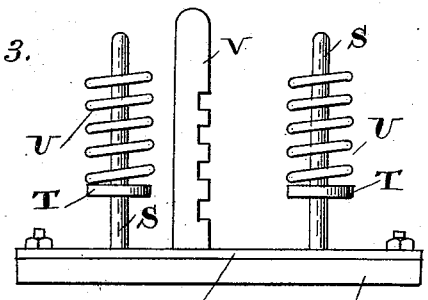
Figure 4:
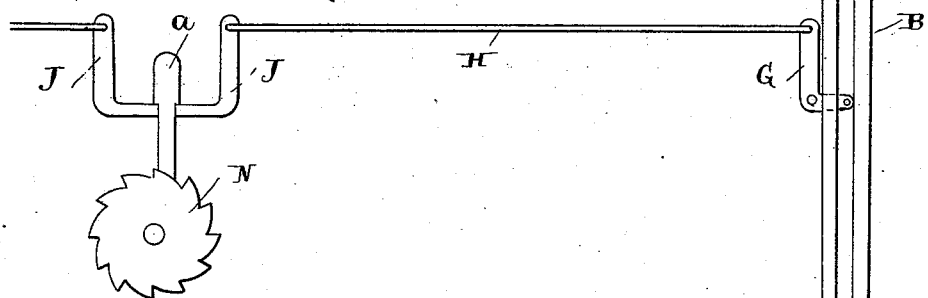
Figure 2:
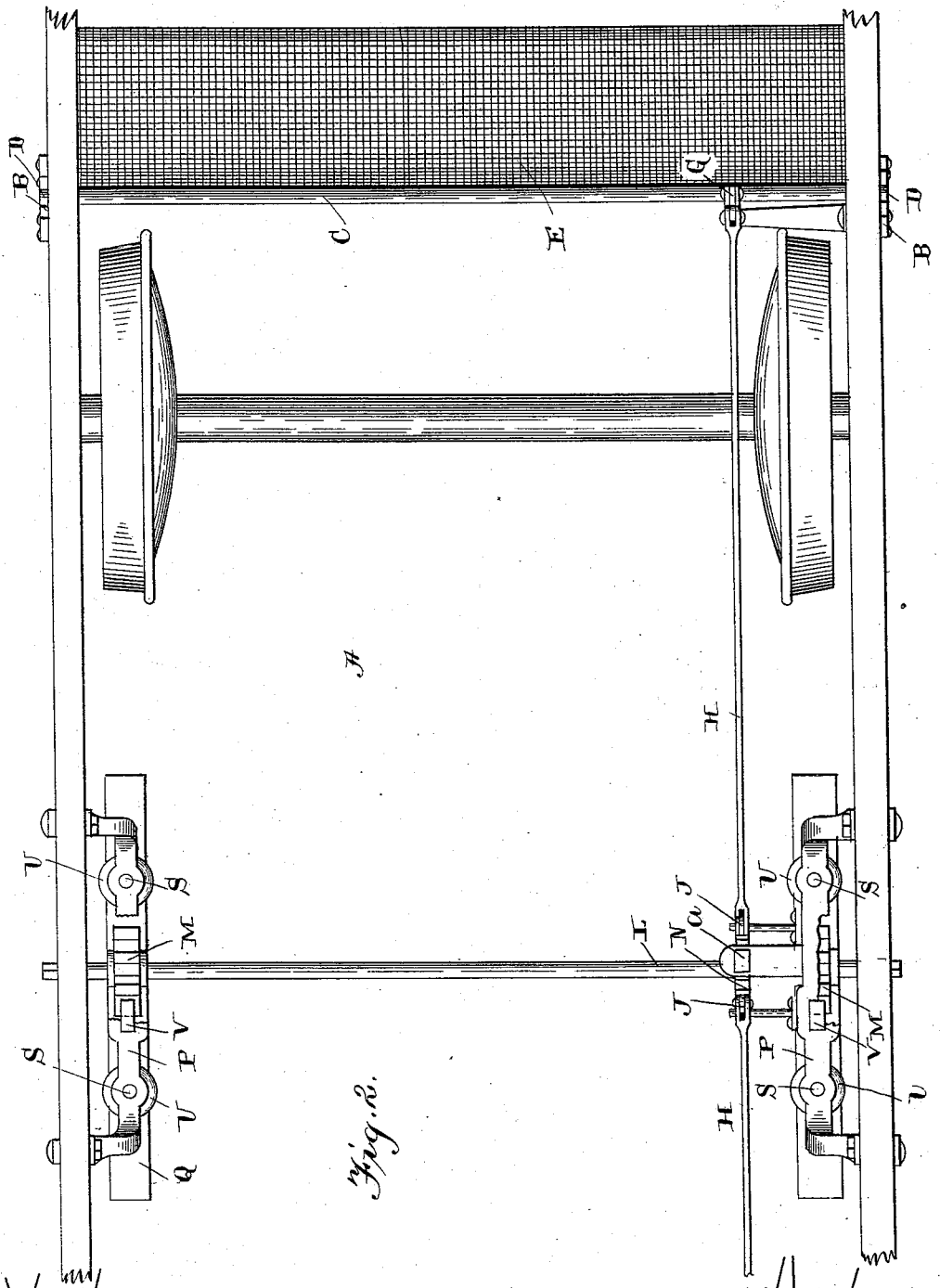

In the accompanying drawings:—Figure 1 is a side elevation of one end of a car truck showing my invention applied thereto. Fig. 2 is a plan view of the same. Fig. 3 is a detached view of the spring actuated brake. Fig. 4 is a detached view of the tripping mechanism for the brake.

A indicates one end of a car truck, and B U-shaped guide-ways which extend down from each side and end of said truck in front of the wheels. A fender C is provided with laterally extending pins or projections D which move in said guide-way, and support the fender upon springs F suitably held in said guide-ways. This fender is L-shaped in cross-section and has its lower horizontal portion E extending outward in front of the car, for the purpose of scooping up any person or object struck, the weight of which upon the fender causes it to descend within the said guide-ways, as the supporting springs F are made of a tension to just support it a few inches above the track, and make it susceptible to depression under a very light weight.

Depending from each side of the truck intermediate its ends and between the wheels, are the castings P, having depending ears or portions K in which a transverse shaft L is journaled, which shaft extends entirely across the said truck, as clearly shown in Fig. 2. Rigidly secured to opposite ends of this shaft are the cog wheels M, which mesh in the segmental racks V extending upward from a track brake Q, carrying a detachable wood or other suitable surface R for engaging the track. Extending upward from this brake Q are the standards S which move in the castings P, as do also the segmental racks V. Suitably attached to standards S are the collars T, upon which the lower ends of springs U rest, the upper ends of these springs engaging a cross web of the castings P, so that the said springs normally force the track brake downward.

Rigidly attached to the transverse shaft L, is a ratchet wheel N, and supported in suitable guide-ways of the castings P are the vertically moving bolts or pins $a$, which engage the said ratchet wheel and lock it and thereby the said transverse shaft against rotation. Pivoted at each side of this ratchet wheel are the bell crank levers J, which have their lower ends engaging the said bolt, and connected with their opposite and upper ends are the rods H which extend in opposite directions to opposite ends of the truck and are connected with bell crank levers G pivotally supported by the U-shaped guide-ways B, the opposite ends of these bell crank levers being connected with the upper ends of the fenders C.

The operation of the invention is as follows:—The spring actuated track brakes are raised from the track the desired distance by applying a wrench to the squared end or ends of the transverse shaft L, and turning the same, which through the medium of the cog wheels and the segmental racks effects the raising of the brakes. When the brakes are elevated the desired distance, they are held in this position by means of the bolt $a$ which engages the ratchet wheel N for that purpose. The brakes being set, they are instantly tripped by the fender encountering a person or other object of sufficient weight to depress its outer end, which through the medium of the bell crank levers raises the locking bolt from the ratchet wheel, thus releasing the transverse shaft and permitting the brakes to descend upon the track under the pressure of the springs U.

From the above description it will be seen that I have devised a very simple construction whereby a person or other object will cause the car to be braked instantly when hit by the front end of the car.

There will be a fender at each end of the car, so that no matter in which direction the car is moving, the operation of tripping the brakes will be the same.

Having thus described my invention, what I claim, and desire to secure by Letters Patent, is—

1. The combination of a movable fender, a spring actuated brake, a lock for the brake, and a trip operatively connecting the lock and the fender, substantially as described.

2. The combination of a movable fender, a vertically moving spring actuated brake, a rack connected with said brake, a shaft engaging the rack, a lock for the shaft and a connection between the lock and the fender, substantially as specified.

3. The combination with a movable fender, of a spring actuated brake, a shaft operatively connected with said brake for holding and moving it against the pressure of the brake, a lock for the shaft, and a connection between the fender and the lock, substantially as set forth.

4. The combination with a movable fender, of a spring actuated brake, a shaft operatively connected with said brake for moving it against the pressure of the spring, a ratchet wheel carried by said shaft, a lock engaging said ratchet wheel, and a connection between the fender and the said lock, substantially as described.

5. The combination with a movable fender, of a spring actuated brake at each side of the car, a shaft extending transversely across and operatively connected with each brake for moving and holding the same against the pressure of the springs thereof, a lock for said shaft, and a connection between the shaft and the said lock, substantially as specified.

6. The combination with a movable fender, of a spring actuated brake, a shaft connected with the same for moving and holding it against the pressure of the springs thereof, a lock for the shaft, a bell crank lever engaging said lock for tripping it, and a connection between the bell crank lever and the said movable fender, substantially as set forth.

7. The combination with a spring supported vertically movable fender, of a spring actuated vertically movable brake, a lock for said brake, a bell crank lever having one end engaging said lock, and a connection between the opposite end of said lever and the movable fender, substantially as described.

In testimony whereof I affix my signature in presence of two witnesses.

HENRY MAASS.

Witnesses:
HENRY BUCHUS,
GUSTAV SCHUMANN.